US012680365B2

(12) United States Patent
Reif

(10) Patent No.: US 12,680,365 B2
(45) Date of Patent: Jul. 14, 2026

(54) DRIVE DEVICE FOR DRIVING A VEHICLE FLAP

(71) Applicant: Stabilus GmbH, Koblenz (DE)

(72) Inventor: Thomas Reif, Kobern-Gondorf (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 19/214,837

(22) Filed: May 21, 2025

(65) Prior Publication Data

US 2025/0369272 A1 Dec. 4, 2025

(30) Foreign Application Priority Data

May 31, 2024 (DE) ......................... 102024115230.3

(51) Int. Cl.
*E05F 15/627* (2015.01)

(52) U.S. Cl.
CPC ....... *E05F 15/627* (2015.01); *E05Y 2201/654* (2013.01); *E05Y 2201/66* (2013.01); *E05Y 2201/668* (2013.01); *E05Y 2900/544* (2013.01)

(58) Field of Classification Search
CPC ......................... E05F 15/627; F16H 2055/363
USPC ........................................................... D8/360
See application file for complete search history.

(56) References Cited

U.S. PATENT DOCUMENTS

D285,646 S * 9/1986 Hahn ............................ 114/294
D366,824 S * 2/1996 Moore ........................... D8/360
6,068,321 A * 5/2000 Ooms ................ B62D 33/0273 296/57.1
6,793,264 B1 * 9/2004 Muller .................. E05F 1/1091 49/386
7,677,628 B2 * 3/2010 Lowentat .............. E05F 15/627 296/57.1
(Continued)

FOREIGN PATENT DOCUMENTS

CN 109488153 A * 3/2019 ............... E06B 7/28
DE 19800787 C1 * 7/1999 ............. F16H 55/36
(Continued)

*Primary Examiner* — Catherine A Kelly
(74) *Attorney, Agent, or Firm* — Hovey Williams LLP; Kameron D. Kelly

(57) ABSTRACT

The invention relates to a drive device (16) for driving a vehicle flap (12), comprising a traction means (18) and a deflection roller (20) with a groove base (42) and roller surfaces (44, 46), wherein the roller surfaces (44, 46) extend further radially outward with respect to the axis of rotation (Y) than the groove base (42) does, wherein the deflection roller (20) is designed to guide the traction means (18) in such a way that a first portion of the traction means (18) is in contact with the groove base (42), while a second portion of the traction means (18) is in contact with one of the roller surfaces (44, 46), so that the second portion of the traction means (18), with respect to the axis of rotation (Y) and compared to the first portion of the traction means (18), is displaced both in the axial direction (Y) and radially outward, wherein the deflection roller (20) has a cross section according to which each roller surface (44, 46) extends in a convex manner from the groove base (42) to a corresponding side surface of the deflection roller (20), which delimit the deflection roller (20), viewed in the axial direction. The invention further relates to a corresponding vehicle flap arrangement (10).

15 Claims, 4 Drawing Sheets

(56) References Cited

U.S. PATENT DOCUMENTS

| | | | | |
|---|---|---|---|---|
| 7,815,242 | B2 * | 10/2010 | Yoshida | E05F 15/646<br>296/146.4 |
| 8,684,441 | B2 * | 4/2014 | Kerr, III | B60J 5/108<br>296/57.1 |
| 8,764,090 | B2 * | 7/2014 | Kerr | E05F 15/627<br>296/57.1 |
| D757,525 | S * | 5/2016 | Glasband | D8/360 |
| 9,522,704 | B1 * | 12/2016 | Krajenke | B62D 33/0273 |
| 10,604,390 | B1 * | 3/2020 | Hall | B21D 53/261 |
| 11,178,815 | B1 * | 11/2021 | Crowl | A01D 69/03 |
| 11,254,371 | B2 * | 2/2022 | Harris | B62D 33/03 |
| 12,044,053 | B2 * | 7/2024 | Reif | E05F 15/627 |
| 12,188,290 | B2 * | 1/2025 | Elsmark | E05F 1/025 |
| 12,552,467 | B2 * | 2/2026 | Reif | B62D 33/03 |
| 2018/0245392 | A1 * | 8/2018 | Cousin | B60J 5/06 |
| 2022/0056750 | A1 * | 2/2022 | Reif | E05F 15/627 |
| 2023/0202373 | A1 * | 6/2023 | Walker | B60P 1/435<br>296/146.1 |
| 2025/0369271 | A1 * | 12/2025 | Reif | E05F 15/627 |

FOREIGN PATENT DOCUMENTS

| | | | | |
|---|---|---|---|---|
| DE | 102016118388 | A1 * | 3/2018 | E05F 15/627 |
| DE | 102012020789 | B4 * | 3/2024 | F16H 57/0006 |
| FR | 2796097 | A1 * | 1/2001 | E05F 1/1091 |
| FR | 2885159 | A1 * | 11/2006 | E05D 11/00 |
| KR | 102035573 | B1 * | 10/2019 | E05F 15/689 |
| KR | 20230069736 | A * | 5/2023 | E05F 15/627 |
| WO | WO-2014061599 | A1 * | 4/2014 | E05F 15/646 |

* cited by examiner

DRIVE DEVICE FOR DRIVING A VEHICLE FLAP

RELATED APPLICATIONS

This U.S. patent application claims priority to German Patent Application No. 102024115230.3, filed on May 31, 2024, which is hereby incorporated by reference in its entirety.

The present invention relates to a drive device for driving a vehicle flap, in particular a drop gate.

From the prior art, drop gates are known, in which a drive device for retracting or releasing a traction cable is arranged in the body of a vehicle. This has major disadvantages, particularly with regard to the very limited space available within the body and with regard to accessibility, in particular when retrofitting.

It is therefore the object of the present invention to provide a drive device for driving a vehicle flap or a vehicle flap arrangement which allows an improved use of the installation space, compared to the prior art.

This object is achieved according to one aspect of the present invention by a drive device for driving a vehicle flap, in particular a drop gate, comprising a cable-like traction means which is suitable for transmitting tractive forces, and a deflection roller which has an axis of rotation around which the deflection roller is rotatably mounted, and a guide profile which runs around the axis of rotation and has a groove base and roller surfaces adjoining it on both sides of the groove base, wherein the roller surfaces extend further radially outwards with respect to the axis of rotation than the groove base does, wherein the deflection roller is designed to guide the traction means in such a way that a first portion of the traction means is at least in portions in contact with the groove base, while a second portion of the traction means is in contact with one of the roller surfaces, so that the second portion of the traction means is displaced both in the axial direction and radially outward with respect to the axis of rotation and compared to the first portion of the traction means, wherein the deflection roller, viewed in a sectional plane containing the axis of rotation, has a cross section according to which each roller surface extends in a convex manner from the groove base to a corresponding side surface of the deflection roller, which delimit the deflection roller, viewed in the axial direction.

In this context, the convex extension can mean in particular that each roller surface, viewed in cross section, does not extend in a straight line from the groove base to the corresponding side surface, but rather that the roller surface initially runs more in the radial direction than in the axial direction, then merges into a region in which the increase in distance of the roller surface to a center point, which lies on the axis of rotation and centrally between the two side surfaces, is substantially the same in the radial direction and in the axial direction. This can be followed by a region of the roller surface in which the axial increase in distance of the roller surface to the center point is greater than the radial increase. Due to this convex course of the roller surface, the traction means can be provided with support in the central region of the roller surface, so that the traction means can be prevented from jumping off the deflection roller when the traction means is deflected, in the axial direction, from a straight-line run-out from the groove base (orthogonal to the axis of rotation).

When there is such a deflection in the axial direction (i.e., in a direction parallel to the axis of rotation), the contact surface of the traction means on the roller surface can describe a helical path on the roller surface.

The traction means can be for example a cable, in particular a wire cable, which can additionally be provided with a sheath, such as a plastics coating.

In the case of deflection rollers which have a straight-line roller surface from the groove base to the corresponding side surface, the traction means is not supported and thus held on the roller; rather, the traction means is released from the deflection roller as soon as a certain angle of the traction means relative to the axis of rotation is reached. Furthermore, the traction means does not run helically along the roller surface, but in a straight line, wherein an angular velocity at the outer end of the roller surface (adjacent to the side surface of the deflection roller) is greater than in a region of the roller surface adjacent to the groove base, resulting in a strong relative movement of the roller surface transverse to the longitudinal direction of the traction means at the outer end of the roller surface, and thus increased wear. In the drive device according to the invention, the relative movement of the roller surface transverse to the longitudinal direction of the traction means at the outer end of the roller surface is significantly reduced due to the helical course of the traction means on the roller surface, so that wear of the traction means is also reduced.

The convex curvature of the cross section of at least one roller surface, in particular both roller surfaces, can run in the shape of a circular arc or as a sequence of different curvature radii, which can merge into one another in particular tangentially. The complete roller surface, or the convex curvature of its cross section from the groove base to the side surface, can also run in a circular arc. In the case in which the roller surface is formed from a sequence of different curvature radii, a tangential transition can make it possible to avoid an edge at the transition from one curvature radius to another, which in turn could increase wear of the traction means.

Advantageously, a curvature of the groove base can substantially correspond to an outer contour of the traction means, viewed in its cross section. This allows the traction means to be in surface contact in the groove base. Therefore, jamming or crushing of the traction means, and thus damage to the traction means, can be avoided.

The drive device can further comprise a motor drive which is designed to retract or release the traction means at least in portions. By shortening the length of the traction means from the drive device to a fastening point of the traction means on a vehicle body, the vehicle flap can be pulled towards the body and in this way an opening can be closed by the vehicle flap. For example, the motor drive can have a voltage consumption of 3V when lowering or opening the vehicle flap and 8.5V when raising or closing the vehicle flap. In particular, a torsion bar can be arranged between the vehicle flap and the vehicle body in such a way that a torsional force applied by the torsion bar preloads the vehicle flap in its opening direction or moves it automatically, i.e., without further actuation by a user. This torsional force can also be used to achieve a weight balance against the force of gravity acting on the vehicle flap, for example when the vehicle is in an inclined position. The flap opening speed can also be influenced by means of the above-mentioned drive current supply to the motor drive in the opening direction. In contrast to a non-powered opening operation of the vehicle flap, the opening movement can be slowed down or accelerated, depending on the vehicle position (uphill or downhill) and/or system friction, for example due to different temperature influences.

The motor drive can be designed to drive a cable roller in such a way that the traction means is wound onto it or unwound from it. Winding it onto the cable roller allows controlled storage of the traction means when retracted by the motor drive, and therefore unhindered release of the traction means from the cable roller in order to open the vehicle flap. The cable roller can be assigned a freewheel, which is preloaded by a resilient spring element, such as a spiral spring, in the winding-on direction of the traction means onto the cable roller. This prevents the tension of the traction means from decreasing to such an extent that the traction means leaves its substantially straight-line path, possibly becoming detached from the deflection roller. In particular, the freewheel can only be operated in the winding-on direction independently of the operation of the motor drive, but can be blocked against the winding direction by, for example, a ratchet mechanism. Supplying the motor drive with approx. 3V in the opening direction, as mentioned above, can also mean that the spiral spring force for maintaining the traction means tension no longer has to be overcome by the torsional force of the torsion bar alone for automatic opening, since a force corresponding to the spiral spring force can be applied by the motor drive supplied with approx. 3V. This means that greater opening forces can be made available for an opening operation of the vehicle flap. This can be in particular relevant for boundary of the vehicle, and/or an increase in friction of the associated components at low temperatures.

In particular, the traction means may comprise a stop element which is designed to lie against a counter-stop surface so that a tractive force introduced into the traction means is introduced into the counter-stop surface via the stop element. By introducing the tractive force introduced into the traction means via the stop element into the counter-stop surface, tractive forces, caused for example by a load on the vehicle flap, can be prevented from being introduced into the motor drive via the traction means. On the one hand, this can prevent damage to the motor drive, and on the other hand the motor drive can be dimensioned differently, for example smaller, since it does not have to withstand such forces.

In this case, the counter-stop surface can be formed on a housing that at least partially surrounds the deflection roller. For example, the deflection roller can be mounted in a housing which also has fastening means so that the deflection roller can be fastened to the vehicle flap together with the housing. The traction means can then run from the vehicle body to the deflection roller, be deflected in its direction of travel by the deflection roller, and then run through a housing wall in the direction of the motor drive. The housing wall through which the traction means runs can form the counter-stop surface on its outside in that the stop element, which cannot be displaced by the traction means at least in one direction along the traction means, lies against the outside of the housing wall. By selecting the position of the stop element on the traction means, it is possible to set the maximum opening position up to which the vehicle flap should be displaceable relative to the vehicle body.

Of course, the counter-stop surface does not have to be formed directly on the housing wall; rather, it is also conceivable that an extension element is connected to the housing wall, such as a tubular element through which the traction means runs, so that the stop element can lie on an end of the extension element opposite the housing, instead of directly on the housing wall. This means that a tractive force introduced into the traction means can be introduced via the stop element into the counter-stop surface formed on the extension element, via said counter-stop surface into the housing surrounding the deflection roller, and thus into the vehicle flap.

In this context, it is also conceivable that the traction means, in a region between the stop element and the motor drive, can have a smaller diameter than in a region between the stop element and the vehicle body, since the traction means in the region between the stop element and the motor drive only has to withstand (including a predetermined safety factor) those forces which are introduced into the traction means by the displacement of the vehicle flap, but not those forces which occur due to a load on the vehicle flap, for example when loading a loading area which can be closed to the rear by the vehicle flap, since in a corresponding opening position of the vehicle flap the stop element already rests against the counter-stop surface. In this way, the necessary storage space on the cable roller for the wound/to-be wound traction means can also be reduced.

Furthermore, the drive device can comprise a guide element which is arranged directly adjacent to the deflection roller in such a way that it is not in contact with the traction means during operation of the drive device, but such that it is suitable for preventing complete detachment of the traction means from the deflection roller in the event of malfunction of the drive device. Such a malfunction may, for example, be a direct action on the traction means, in particular in a direction transverse to the longitudinal extension of the traction means.

According to a further aspect of the present invention, the object mentioned at the outset is achieved by a vehicle flap arrangement comprising a drive device according to the invention according to any of the preceding claims,

- a vehicle flap, in particular a drop gate, which is pivotably mounted relative to a body of a vehicle,
- wherein the traction means is connected or connectable on the one hand to the body of the vehicle and on the other hand to the vehicle flap in a traction-force-transmitting manner,
- wherein the deflection roller is arranged on the vehicle flap.

For the sake of completeness, it should be explicitly pointed out at this point that all features, advantages and effects which have been described here in connection with the drive device according to the invention can also be applied to the vehicle flap arrangement according to the invention, and vice versa.

The provision of a drive device according to the invention in the vehicle flap can, on the one hand, make it possible to better utilize the installation space available in a vehicle and, on the other hand, to reduce disruptions in the operation of the drive device in the vehicle flap, since the special design of the deflection roller of the drive device according to the invention can provide improved guidance of the traction means.

It is conceivable to arrange exactly one drive device according to the invention in the vehicle flap, and thus to realize a drive of the vehicle flap via the traction means on only one side of the vehicle flap, as well as to arrange two drive devices according to the invention in the vehicle flap or to redesign the one drive device according to the invention in such a way that a traction means runs to the body of the vehicle on both sides of the vehicle flap, so that a two-sided drive of the vehicle flap relative to the body of the vehicle can be realized.

As already mentioned above by the term "connectable," the one or more traction means can be designed to be detachably attached to the body of the vehicle so that a user can separate the particular traction means from the body of the vehicle in order, for example, to displace the vehicle flap beyond an end position defined by the drive device according to the invention, such as a vertically downward-hanging position of the vehicle flap.

For this purpose, the deflection roller can be arranged in a side wall of the vehicle flap, so that the traction means runs from the body to the deflection roller on the side wall of the vehicle flap and then over the deflection roller into an interior of the vehicle flap. Since the side walls of vehicle flaps in most cases standardly have reinforcements in order to be able to withstand loads applied to the vehicle flap and/or forces introduced into the vehicle flap via end stop cables, further reinforcements for the arrangement of the drive device according to the invention can be omitted.

It is also conceivable to be able to attach the drive device according to the invention, as a retrofit kit, to standard vehicle flaps which have not already been designed for this purpose at the factory.

In particular, in the case in which the traction means is wound onto a cable roller, but not limited thereto, the drive device according to the invention can allow a controlled or dampened opening of the vehicle flap, even if an associated motor drive should be without power.

Advantageously, at least a portion of the groove base can be arranged to protrude beyond the side wall and/or a guide element. For example, a portion of the groove base which is located furthest away from a center, viewed along the width direction of the vehicle flap, can protrude slightly above the associated side wall or a guide element arranged thereon. This can prevent the traction means from rubbing against the vehicle flap or the guide element, which in turn can prevent excessive wear and/or damage to the traction means. "Slightly" can be understood, for example, to mean that a maximum of 20%, in particular a maximum of 10%, of the entire groove base protrudes beyond the associated side wall or a guide element arranged thereon, and/or that the outermost groove base portion protrudes a maximum of 10 mm, in particular a maximum of 5 mm, beyond the associated side wall or a guide element arranged thereon.

In the vehicle flap arrangement according to the invention described here, the vehicle flap is displaceable from a closed position, in which it closes an opening in the body, to a fully open position, wherein the closed position corresponds to an opening angle of 0°, and wherein the vehicle flap is displaceable up to an opening angle of 100°, in particular of 90°, of the fully open position. The "opening in the body" does not have to be an opening completely enclosed by a wall, but rather can also be understood to mean that a (possibly additional) opening is created by opening the vehicle flap. This is the case, for example, with a drop gate on a pick-up truck, which closes off the loading area of the vehicle at the rear, although the loading area may be open at the top.

In particular, the axis of rotation of the deflection roller can be arranged at an angle to a main extension surface of the vehicle flap and/or to a side edge of the vehicle flap which is formed at a transition between the main extension surface and the side wall, such that when the vehicle flap is in a center position, which substantially corresponds to the center of the maximum possible pivoting range, the traction means leaves the groove base in a direction which is substantially orthogonal to the axis of rotation. Since possible designs of the deflection roller result in a skewed (i.e., non-overlapping) arrangement of the axis of rotation to the direction in which the traction means leaves the groove base, the feature "orthogonal" can also relate to a projection of the two axes/directions in a direction which is defined by a shortest connection of the two axes to one another. This arrangement allows the traction means to assume an identical, but mirrored, path of the roller surface in the two end positions of the possible pivoting range of the vehicle flap.

Furthermore, the vehicle flap arrangement can comprise a further deflection roller which is arranged in the interior of the vehicle flap arrangement. The further deflection roller can be designed to deflect a portion of the traction means which lies between the deflection roller and the drive device. This means that the drive device can be positioned anywhere in the vehicle flap, for example close to the side wall on which the deflection roller is also arranged. Without the additional deflection roller or rollers, the angle of wrap of the deflection roller by the traction means can be so large that excessive loading and/or wear of the traction means occurs, or the introduction of the traction means onto the deflection roller can be impeded by other components of the vehicle flap.

In a further development of the present invention, a distance of a pivot axis of the vehicle flap relative to the body from a fastening point of the traction means on the body can substantially correspond to a distance of the pivot axis of the vehicle flap relative to the body from the deflection roller, in particular a center point on the axis of rotation between the two side surfaces of the deflection roller. In this way, when the vehicle flap on the vehicle body is closed, the deflection roller can be arranged in the region of the fastening point of the traction means on the body. This means that the traction means can be retracted unhindered via the deflection roller up to the final closing position of the vehicle flap and the traction means can be accommodated to the maximum extent in the vehicle flap. This also helps prevent damage to the traction means and/or the deflection roller, which can occur if the traction means becomes jammed when the vehicle flap is closed.

In the following, the present invention is described in more detail by means of an exemplary embodiment with reference to the accompanying drawings. In the drawings.

Figure 1:
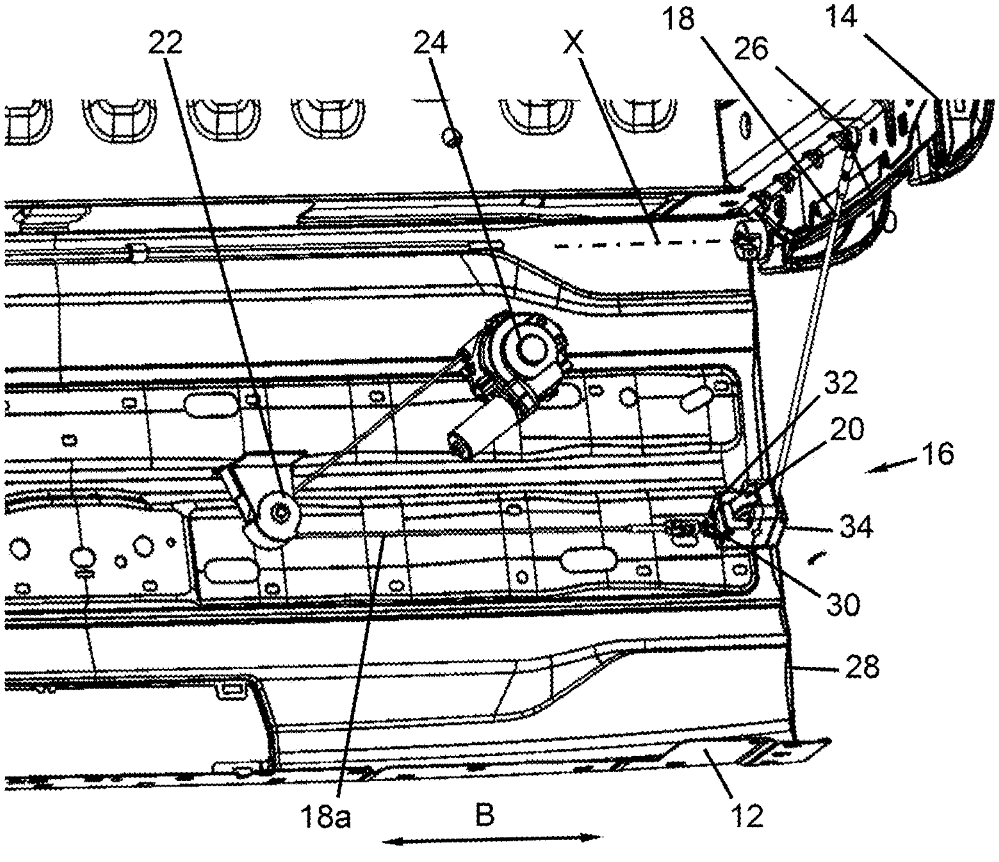
FIG. 1 is a schematic plan view of a vehicle flap arrangement according to the present invention.

In FIG. 1, a vehicle flap arrangement according to the invention is generally designated by the reference sign 10. The vehicle flap arrangement 10 comprises a vehicle flap 12, which is designed here as a drop gate (also referred to as a "loading flap"), which is arranged at a rear or a rear end of a loading area on a vehicle body 14 and is pivotably mounted about a pivot axis X relative to said body.

The vehicle flap arrangement 10 further comprises a drive device, which is generally designated by the reference sign 16. The drive device 16 comprises a traction means 18 and a deflection roller 20. Furthermore, the drive device 16, in the exemplary embodiment shown here, comprises a further deflection roller 22 and a motor drive 24, which is designed to wind the traction means 18 onto a cable roller or to unwind it therefrom. The traction means 18 is connected to the body at a fastening point 26 in a detachable manner such that, in the connected state, tractive forces can be transmitted to the vehicle body 14 via the traction means 18.

As can be seen in FIG. 1, in the embodiment shown here the traction means 18 runs in a straight line from the fastening point 26 to a side wall 28 (see also FIG. 2) of the vehicle flap 12 on which the deflection roller 20 is arranged. Via the deflection roller 20, the traction means 18 is redirected into an interior of the vehicle flap 12, wherein it extends here in a substantially right-angled manner relative to the side wall 28, or substantially in a width direction B (see arrow B in FIG. 1). Via the further deflection roller 22, the traction means 18 is then displaced in a direction towards the motor drive 24 and then enters a housing of the motor drive 24.

If the motor drive 24 is actuated in such a way that it winds up the traction means 18 on the cable roller, the length of the traction means, which in the embodiment shown runs from the motor drive 24 to the fastening point 26 in the manner mentioned above, is shortened and the vehicle flap 12 is displaced about the pivot axis X in the direction of a closed position in which the vehicle flap 12 closes a rear opening of the body 14.

The position of the vehicle flap 12 relative to the body 14 shown in FIG. 1 corresponds to a maximum opening position. This means that if the closed position represents a first end position of a maximum permissible pivoting range of the vehicle flap 12, the maximum opening position according to FIG. 1 corresponds to the second end position of the maximum permissible pivoting range of the vehicle flap 12. The fact that the position of the vehicle flap 12 relative to the body 14 shown in FIG. 1 is an end position can also be seen from the fact that a stop element 30, which is connected to the traction means 18 at a predetermined position such that it is attached so as not to be displaceable at least along the traction means 18 (but can optionally be attached so as to be freely rotatable), lies against a counter-stop surface 32, which is formed here by an outer housing wall of a housing 34 which at least partially surrounds the deflection roller 20. As soon as the stop element 30 rests against the counter-stop surface 32 in a force-transmitting manner, a force acting on the vehicle flap 12 (for example in a direction which runs into the plane of the drawing in FIG. 1) is introduced into the housing 34 via fastening means which connect the housing 34 to the vehicle flap 12 and thus into the traction means 18 via the deflection roller 20 connected to the housing 34. Since the stop element 30 in cooperation with the counter-stop surface 32 prevents a lengthening of the distance between the deflection roller 20 and the fastening point 26, the force is transmitted into the body 14 via the portion of the traction means 18 between the stop element 30 and the fastening point 26.

From the force curve described above, it can be seen that in this end position of the vehicle flap 12, no loading forces are introduced into a portion **18*a* of the traction means 18 which runs from the stop element 30 to the motor drive 24. Since the portion 18*a* of the traction means 18 only has to withstand those forces which occur when the vehicle flap 12 is opened and closed, the portion 18*a* of the traction means 18 can be designed with a reduced diameter compared to the portion of the traction means 18 which runs between the stop element 30 and the fastening point 26**.

Figure 2:
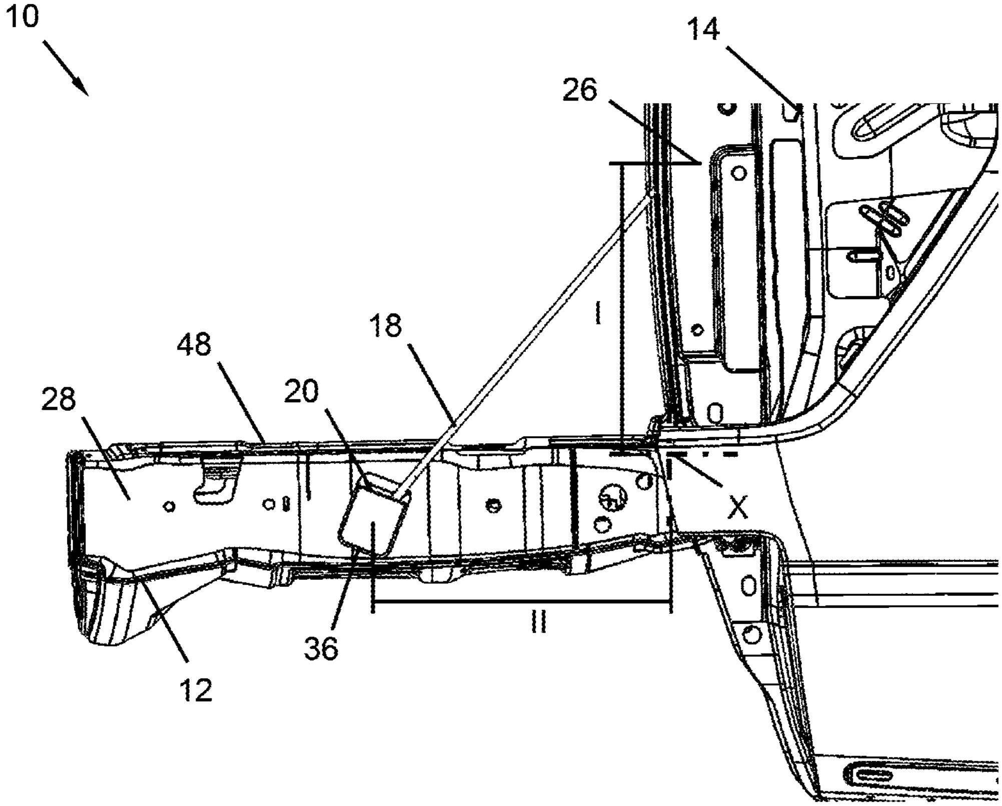
FIG. 2 is a side view of the vehicle flap arrangement from FIG. 1.

In FIG. 2, the vehicle flap arrangement 10 from FIG. 1 is shown in a side view, i.e., the viewing direction in FIG. 2 corresponds substantially to the width direction B. As can be seen, the vehicle flap 12 runs substantially horizontally from the body 14 to the rear (to the left in FIG. 2), so that the maximum permissible pivoting range of the vehicle flap 12 between the maximum opening position shown in FIG. 2 and the closed position, in which the vehicle flap 12 extends substantially vertically upwards from the pivot axis X and closes a loading area of the body 14 at the rear, is approximately 90°. If it is desired to pivot the vehicle flap 12 further downwards beyond the maximum opening position shown in FIG. 2, the traction means 18 can be released from the fastening point 26 of the body 14 and thus pivoted freely downwards.

In FIG. 2 it can also be seen that a distance I of the fastening point 26 (which in FIG. 2 is concealed by a portion of the body 14 and therefore cannot be seen) from the pivot axis X substantially corresponds to a distance II between the pivot axis X and the deflection roller 20 (which in FIG. 2 is concealed by a guide element 36).

The guide element 36 can form a portion of the housing 34 or can be attached as a separate element to the housing 34 or the side wall 28. The guide element 36 can ensure that the traction means 18 does not jump off the deflection roller 20, even in the event of incorrect operation such as direct action on the traction means 18 or manual closing of the vehicle flap 12 without the traction means 18 being wound onto the cable roller, causing the traction means 18 to lose tension.

By designing the distance I to be substantially equal to the distance II, it can be ensured that the opening of the guide element 36, at which the traction means 18 exits, is arranged almost or actually coinciding with the fastening point 26 in the closed position of the vehicle flap 12, so that the traction means 18 can be retracted in a reliable manner by the motor drive 24 until the complete closed position of the vehicle flap 12 on the body 14.

Figure 3:
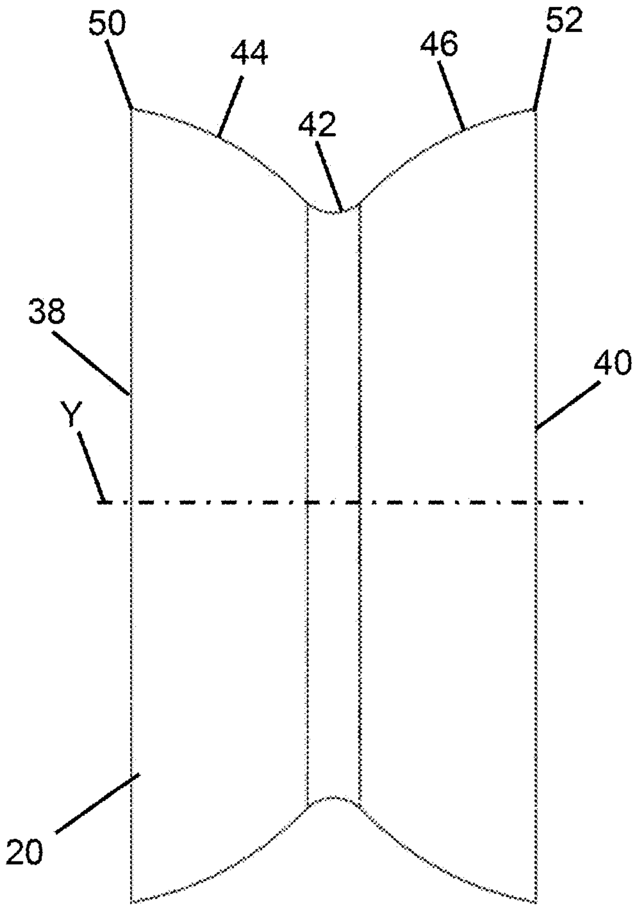
FIG. 3 is a plan view of a deflection roller according to the drive device according to the invention.

FIG. 3 shows a plan view of the deflection roller 20. It is shown here that the deflection roller 20 comprises an axis of rotation Y, about which the deflection roller 20 is rotatably mounted relative to the side wall 28 of the vehicle flap 12. The deflection roller 20 has two side surfaces 38 and 40 which delimit the deflection roller 20 in the axial direction of the axis of rotation Y. In a radial direction (orthogonal to the axis of rotation Y), the deflection roller 20 is delimited between the two side surfaces 38 and 40 by a roller profile which has a groove base 42 and, viewed in the axial direction Y, has an adjoining roller surface 44 or 46 on each side. Each roller surface 44, 46 extends from the groove base 42 in a convex manner. In the embodiment of the deflection roller 20 shown in FIG. 3, the convex course of each roller surface 44, 46 is in the shape of a circular arc, i.e., the curvature is constant. In the embodiment shown in FIG. 3, a center of curvature of the circular-arc-shaped roller surface 44, 46, or the cross section thereof, lies outside the axis of rotation Y and outside the region of the deflection roller 20 delimited by the two side surfaces 38 and 40.

The cross section of the groove base 42 also runs in the shape of a circular arc, wherein the radius of curvature of the groove base 42 is adapted to a radius of curvature of a cross section of the traction means 18. The groove base 42 and the roller surfaces 44, 46 merge tangentially into one another.

In the event that tractive forces are introduced into the traction means 18 which are not aligned orthogonally to the axis of rotation Y, the traction means 18 can run along the convex course of the roller surfaces 44, 46 in such a way that the traction means 18 is deflected from the groove base 42 along a corresponding roller surface 44, 46 not only in a direction orthogonal to the axis of rotation Y, but at the same time also in the Y direction, and thus leaves the deflection roller 20 via the roller surface 44 or 46. The convex design of the roller surface 44 or 46 here provides support for the traction means 18 in order to prevent the traction means 18 from detaching from the deflection roller 20 in a direction opposite to the exit direction of the traction means 18 from the deflection roller.

Figures 4A, 4B, 4C:
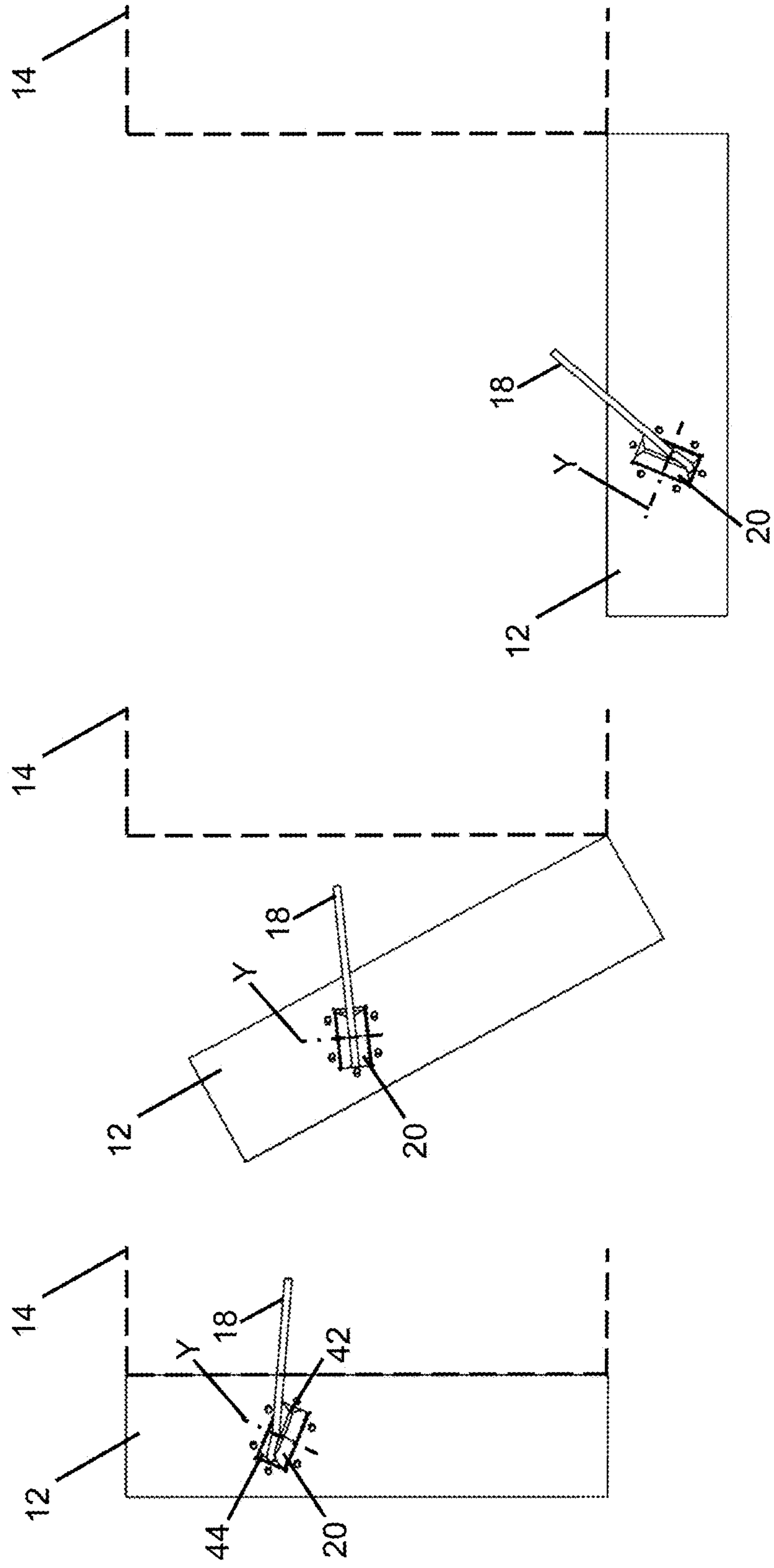
FIGS. 4*a* to 4*c* show a highly simplified representation of a vehicle flap arrangement according to the present invention in the "closed," "half-open," and "open" positions.

Such a course of the traction means 18 over one of the roller surfaces 44, 46 or in a straight line over the groove base 42 is shown in FIGS. 4*a* to 4*c*. In FIG. 4*a*, the vehicle flap 12 is shown in its closed position on the body 14 of the vehicle. It can be seen that the deflection roller 20, or the axis of rotation Y of the deflection roller 20, is oriented at an angle to a main surface 48 of the vehicle flap 12 (see also FIG. 2) and/or at an angle to a vertical direction which runs in an up-down direction in FIGS. 4*a* to 4*c*. In the closed position according to FIG. 4*a*, the traction means 18 runs from the interior of the vehicle flap 12 to the groove base 42 of the deflection roller 20 (in FIG. 4*a*, the left region of the deflection roller 20). The traction means 18 then runs over the roller surface 44 in the direction of the side surface 38 of the deflection roller 20 and leaves the deflection roller 20 shortly before an edge region 50, which is formed by a transition between the roller surface 44 and the side surface 38 (see FIG. 3).

In FIG. 4*b*, the vehicle flap 12 is arranged in a half-open position relative to the body 14. Assuming that the closed position corresponds to 0° and the maximum open position corresponds to 90°, the vehicle flap 12 is at a 45° angle in the position shown in FIG. 4*b*. In this position, which corresponds to a center of a maximum permissible pivoting range, the traction means 18 runs from the interior of the vehicle flap 12 directly to the groove base 42, partially wraps around the groove base 42 and thus the axis of rotation Y, and leaves the groove base 42 in a straight-line direction (orthogonal to the axis of rotation Y) without having a substantial course component in the Y direction. If this above-mentioned condition for a center position of the vehicle flap 12 with an arbitrarily large pivoting range is met, the angle of the axis of rotation Y of the deflection roller 20 relative to the main surface 48 or relative to the vertical direction in the vertical arrangement of the vehicle flap 12 can be deduced. This makes it possible to ensure that the course of the traction means 18 on the corresponding roller surface 44, 46 in the end positions "closed position" and "maximum opening position" is the same, but mirrored, regardless of the size of the maximum permissible pivoting range. In other words, the traction means 18 runs on the roller surface 44 in the closed position in the same way as it runs on the roller surface 46 in the maximum opening position (see FIG. 4*c*), but mirrored.

As a result, the support function of the convex roller surface 44, 46 can be the same in both end positions, and wear of the traction means 18 and/or deflection roller 20 can be the same in both end positions.

FIG. 4*c* shows, as mentioned above, the maximum opening position of the vehicle flap 12, in which the traction means 18 leaves the deflection roller 20 via the roller surface 46 shortly before an edge region 52 (see FIG. 3) in the direction of the body 14.

The invention claimed is:

1. A drive device for driving a vehicle flap comprising
- a cable-like traction means which is suitable for transmitting tractive forces, and
- a deflection roller which has an axis of rotation around which the deflection roller is rotatably mounted, and a guide profile which runs around the axis of rotation and has a groove base and roller surfaces adjoining it on both sides of the groove base, wherein the roller surfaces extend further radially outwards with respect to the axis of rotation than the groove base does,
- wherein the deflection roller is designed to guide the traction means in such a way that a first portion of the traction means is at least in portions in contact with the groove base, while a second portion of the traction means is in contact with one of the roller surfaces, so that the second portion of the traction means is displaced both in the axial direction and radially outward with respect to the axis of rotation and compared to the first portion of the traction means,
- wherein the deflection roller, viewed in a sectional plane containing the axis of rotation, has a cross section according to which each roller surface extends in a convex manner from the groove base to a corresponding side surface of the deflection roller, which delimit the deflection roller, viewed in the axial direction.

2. The drive device according to claim 1,
- wherein the convex curvature of the cross section of at least one roller surface runs in the shape of a circular arc or as a sequence of different curvature radii, which merge into one another tangentially.

3. The drive device according to claim 1,
- wherein a curvature of the groove base substantially corresponds to an outer contour of the traction means, viewed in its cross section.

4. The drive device according to claim 1,
- wherein the drive device further comprises a motor drive which is designed to retract or release the traction means at least in portions.

5. The drive device according to claim 4,
- wherein the motor drive is designed to drive a cable roller in such a way that the traction means is wound onto or unwound from it.

6. The drive device according to claim 1,
- wherein the traction means comprises a stop element which is designed to lie against a counter-stop surface so that a tractive force introduced into the traction means is introduced into the counter-stop surface via the stop element.

7. The drive device according to claim 6,
- wherein the counter-stop surface is formed on a housing which at least partially surrounds the deflection roller.

8. The drive device according to claim 1, wherein the drive device further comprises a guide element which is arranged directly adjacent to the deflection roller in such a way that it is not in contact with the traction means during operation of the drive device but such that it is suitable for preventing complete detachment of the traction means from the deflection roller in the event of malfunction of the drive device.

9. A vehicle flap arrangement, comprising
- a drive device according to claim 1,
- a vehicle flap pivotably mounted relative to a body of a vehicle,
- wherein the traction means is connected or connectable on the one hand to the body of the vehicle and on the other hand to the vehicle flap in a traction-force-transmitting manner,
- wherein the deflection roller is arranged on the vehicle flap.

10. The vehicle flap arrangement according to claim 9,
- wherein the deflection roller is arranged in a side wall of the vehicle flap, so that the traction means runs from the body to the deflection roller on the side wall of the vehicle flap and then over the deflection roller into an interior of the vehicle flap.

11. The vehicle flap arrangement according to claim 10, wherein at least a portion of the groove base is arranged to project beyond the side wall and/or a guide element.

12. The vehicle flap arrangement according to claim 9, wherein the vehicle flap is displaceable from a closed position, in which it closes an opening in the body, to a fully open position, wherein the closed position corresponds to an opening angle of 0°, and wherein the vehicle flap is displaceable up to an opening angle of 100°, in particular of 90°, of the fully open position.

13. The vehicle flap arrangement according to claim 10, wherein the axis of rotation of the deflection roller is arranged at an angle to a main extension surface of the vehicle flap and/or to a side edge of the vehicle flap, which is formed at a transition between the main extension surface and the side wall, such that when the vehicle flap is in a center position, which substantially corresponds to the center of the maximum possible pivoting range, the traction means leaves the groove base in a direction which is substantially orthogonal to the axis of rotation.

14. The vehicle flap arrangement according to claim 9, wherein the vehicle flap arrangement comprises a further deflection roller which is arranged in the interior of the vehicle flap arrangement.

15. The vehicle flap arrangement according to claim 9, wherein a distance (I) of a pivot axis (X) of the vehicle flap relative to the body from a fastening point of the traction means on the body substantially corresponds to a distance of the pivot axis of the vehicle flap relative to the body from a center point on the axis of rotation between two side surfaces of the deflection roller.

* * * * *